(12) United States Patent
Rickert et al.

(10) Patent No.: US 7,578,118 B2
(45) Date of Patent: Aug. 25, 2009

(54) CROP CONVEYING ARRANGEMENT OF A MACHINE FOR HARVESTING CROPS HAVING STALKS

(75) Inventors: Clemens Rickert, Ahaus (DE); Leo Schulze Hockenbeck, Everswinkel (DE); Martin Hüning, Billerbeck (DE); Klemens Weitenberg, Borken (DE)

(73) Assignee: Maschinenfabrik Kemper GmbH & Co KG, Stadtlohn (DE)

( * ) Notice: Subject to any disclaimer, the term of this patent is extended or adjusted under 35 U.S.C. 154(b) by 47 days.

(21) Appl. No.: 11/525,378

(22) Filed: Sep. 22, 2006

(65) Prior Publication Data

US 2007/0101691 A1    May 10, 2007

(30) Foreign Application Priority Data

| Sep. 22, 2005 | (DE) | ........................ 10 2005 045 274 |
| Dec. 17, 2005 | (DE) | ........................ 10 2005 060 453 |

(51) Int. Cl.
*A01D 45/02* (2006.01)
(52) U.S. Cl. .......................................... 56/119; 56/503
(58) Field of Classification Search ................. 56/14.3, 56/500, 503, 51–121
See application file for complete search history.

(56) References Cited

U.S. PATENT DOCUMENTS

| 4,236,369 | A | * | 12/1980 | Decoene ........................ 56/60 |
| 5,722,225 | A | * | 3/1998 | Wuebbels et al. .............. 56/60 |
| 5,845,472 | A | * | 12/1998 | Arnold ........................... 56/94 |
| 5,852,922 | A | * | 12/1998 | Over Behrens et al. ....... 56/14.7 |
| 6,073,429 | A | * | 6/2000 | Wuebbels et al. ............. 56/11.3 |
| 6,298,643 | B1 | * | 10/2001 | Wuebbels et al. .............. 56/60 |
| 6,775,967 | B2 | * | 8/2004 | Wubbels .......................... 56/60 |
| 6,782,682 | B2 | * | 8/2004 | Steppat ........................ 56/119 |
| 6,826,897 | B2 | * | 12/2004 | Wubbels ......................... 56/51 |
| 2003/0079457 | A1 | * | 5/2003 | Wubbels ........................ 56/52 |
| 2003/0101703 | A1 | * | 6/2003 | Wubbels ........................ 56/51 |
| 2004/0123576 | A1 | * | 7/2004 | Bruening ........................ 56/51 |
| 2004/0200201 | A1 | * | 10/2004 | Bruening et al. ................ 56/53 |
| 2005/0005589 | A1 | * | 1/2005 | Bruening et al. ................ 56/51 |
| 2005/0132688 | A1 | * | 6/2005 | Resing ........................... 56/51 |

FOREIGN PATENT DOCUMENTS

| DE | 37 12 507 | 4/1987 |
| DE | 195 27 607 | 6/1999 |
| DE | 101 05 439 | 2/2002 |
| DE | 102 49 457 | 10/2002 |
| EP | 1 305 999 | 5/2003 |
| EP | 1 543 714 | 12/2004 |

* cited by examiner

*Primary Examiner*—Thomas B Will
*Assistant Examiner*—Mai T Nguyen

(57) ABSTRACT

A machine for harvesting crops having stalks includes a plurality of mowing and intake devices for cutting and conveying the crop through a transverse conveying channel in a direction toward a longitudinal midplane of the machine. On each side of the midplane there is provided a deflection channel, which curves rearward in an arc from a direction extending perpendicular to a forward direction of travel of the machine toward an intake channel arranged along the midplane at a rear side of the machine. A deflection conveying drum is arranged adjacent a rear side of the deflection channel to convey the crop coming from the transverse conveying through the deflection channel. An additional conveying wheel, which moves relative to, and has drivers sweeping through, the deflection channel is formed separate from the mowing and intake devices and is arranged on the same side of the midplane as the deflection conveying drum, but has an axis of rotation forward of a forward side of the deflection channel.

5 Claims, 4 Drawing Sheets

CROP CONVEYING ARRANGEMENT OF A MACHINE FOR HARVESTING CROPS HAVING STALKS

FIELD OF THE INVENTION

The invention relates to a machine for mowing crops having stalks, with mowing and intake devices for cutting and conveying the crop; transverse conveying means for conveying the cut crop transversely, at least approximately perpendicular to the forward direction, in the direction towards the longitudinal midplane of the machine; a deflection channel which curves rearward in an arc from a direction extending perpendicular to the forward direction of travel in the direction of an intake channel of a chopping device; and also with deflection conveying means, which during operation convey the crop coming in from the transverse conveying means through the deflection channel.

BACKGROUND OF THE INVENTION

A machine of the type named above is described in DE 102 49 457 A. It includes several mowing and intake devices, which are arranged laterally one next to the other and which are assembled from a bottom cutting disk and conveying wheels, equipped on the periphery with pocket-shaped recesses, arranged above the cutting disk. The crop is conveyed through slots in transverse conveying drums penetrating the rear wall of the machine, supported on the rear sides of the mowing and intake devices in the direction towards the longitudinal midplane of the machine. Inclined conveying drums used as deflection conveying means are arranged in front of the intake channel of a chopping device of a field chopper moving the machine over a field. The inclined conveying drums take the incoming transverse crop stream and deflect it by 90° towards the back, so that it is led into the intake channel of the chopping device. The deflection of the crop towards the back by the deflection conveying means is made easier by curved deflection skids, which are arranged on the base of the machine between the deflection conveying means, and by a cover arranged on the top. Thus the deflection skids and the cover define front and inner limits of a deflection conveying channel through which the deflection conveying means transport the plants. The front end of the deflection skids also act as a crop stripper on the inner intake and mowing drums. A similar machine is described in EP 1 543 714 A.

Consequently, the deflection conveying means convey the plants along stationary surfaces, which requires a certain amount of energy due to the resulting friction. In addition, the deflection skid is subject to clogging under certain crop conditions.

Another machine for mowing crops having stalks is described in DE 37 12 507 C. It includes four mowing and intake devices in the form of drums, which rotate about respective vertical axes and which are equipped with entrainment means, and cutting disks arranged underneath. Two smaller drums are set adjacent to the longitudinal midplane of the machine, while two larger drums are set farther to the outside. The outer drums turn inwards and transfer the crop to stripping rollers, which rotate in opposite directions and which convey the crop inwards at its front side, in turn transferring the crop to the rear sides of the inner drums. The latter in turn output the crop into the intake channel of the chopping device of the field chopper carrying the machine.

Here it is considered a disadvantage that the inner drums must transport all the crop coming in on their side of the longitudinal midplane of the machine, so that their drivers must be dimensioned with large intermediate spaces so that they can receive the necessary, relatively large number of plants. However, this has the result that the plants to be cut at the front sides of the inner drums cannot be securely gripped due to the large intermediate spaces between the drivers. At least some of these plants fall onto the ground and are lost in the harvesting process.

The problem to be solved then is to provide a machine for harvesting plants having stalks, which enables an energy saving deflection of the plants into the intake channel which does not lead to clogging, without including the mowing and intake device arranged in front of the deflection conveying means.

SUMMARY OF THE INVENTION

According to the present invention, there is provided an improved conveying arrangement for a machine for harvesting crops having stalks using mowing and intake devices.

An object of the invention is to provide a conveying arrangement including a conveying device or devices formed separate from the mowing and intake devices and arranged on the same side of the longitudinal midplane of the machine as the deflection conveying device(s).

This object is accomplished by providing a machine for mowing crops having stalks which includes several mowing and intake devices arranged laterally one next to the other for cutting and conveying a harvested crop. Transverse conveying means transport the crop in the direction towards the longitudinal midplane of the machine, in whose vicinity it is led into a curved deflection channel that curves toward the back and through which it finally reaches the intake channel of a harvester carrying the machine and moving during harvesting operation in a forward direction over a field, especially a self-propelled, pulled, or tractor-attached field chopper. Deflection conveying means positioned on the rear side of the deflection channel transport the crop through the deflection channel. It is proposed to attach driven or freely rotating additional conveying means to the front side of the deflection channel, as considered relative to a forward direction of movement of the machine, lying opposite the deflection conveying means. These additional conveying means are formed separately from the mowing and intake device arranged in front of the deflection channel, and are located on the same side of the longitudinal midplane of the machine as the deflection conveying means.

In this way, the additional conveying means transport the plants, in interaction with the deflection conveying means, through the deflection channel with low friction during operation. Furthermore, the additional conveying means clean the deflection channel of plant parts possibly stuck to its walls, so that the risk of clogging is reduced.

The additional conveying means can have different shapes within the scope of the idea forming the basis of the invention. In one possible embodiment, belt or chain conveyors with suitable drivers extending along at least one part of the deflection channel can be used. However, the low susceptibility to maintenance makes a conveyor rotating about an approximately vertical axis preferable, e.g., a drum conveyor with stationary drivers or teeth. It would also be conceivable to use a drum conveyor with drivers that are radial and rotating (like the driving fingers in the transverse auger of a reaper) and/or that rotate (like the reels of reapers), in order to improve the reception and output of the crop. The additional conveying means can also include several conveyors arranged one behind the other in the direction of crop flow.

In one advantageous embodiment of the invention, the deflection channel is delimited at the front by an arcuate deflection skid curved towards the back. The additional conveying means can have drivers that are arranged above this deflection skid or that pass through a slot provided there, so that they project into the deflection channel.

In one preferred configuration, the envelope curves of the deflection conveying means and the additional conveying means overlap, which helps to prevent the accumulation of plant material at the overlapping areas. The envelope curves of the additional conveying means and the mowing and intake device arranged in front of these means can also overlap, which permits the realization of a larger diameter of the additional conveying means and a cleaning function for the mowing and intake device. However, such an overlap is not absolutely necessary.

BRIEF DESCRIPTION OF THE DRAWINGS

In the drawings are shown two embodiments of the invention described in more detail below.

DESCRIPTION OF THE PREFERRED EMBODIMENT

Figure 1:
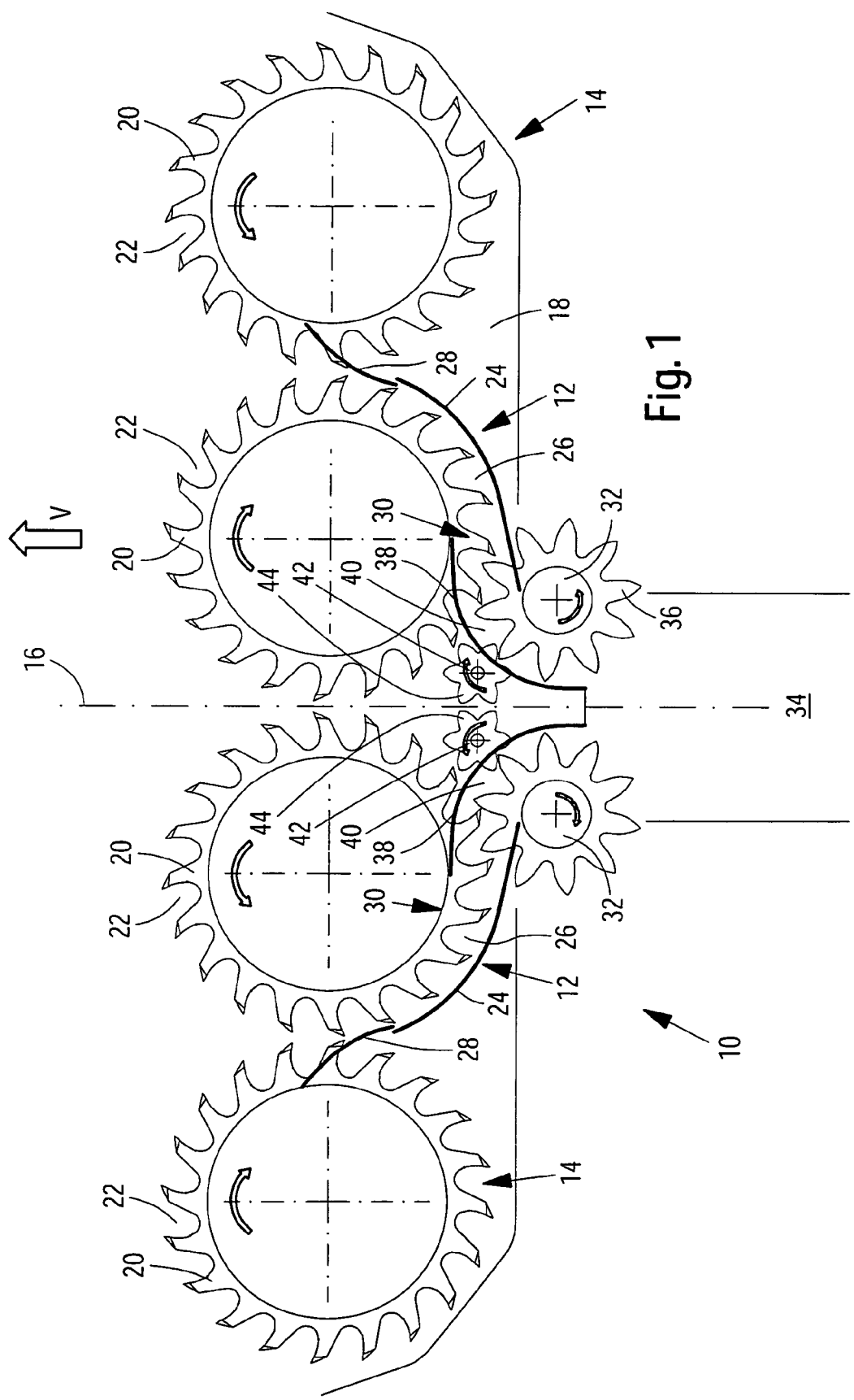
FIG. 1 is a top view of a first embodiment of a machine for mowing crops having stalks.

The machine 10 shown in FIG. 1 for mowing crops having stalks has four mowing and intake devices 12 and 14, which are arranged symmetric to a longitudinal midplane 16 of the machine 10 and which can each have an operating width of, for example, 1.5 m. The machine 10 includes a frame 18.

The mowing and intake devices 12 and 14 are row independent and for that reason include a bottom cutting disk (not shown), which rotates about an approximately vertical axis, and conveying wheels 20, which are arranged coaxially above the cutting disk and whose periphery is equipped with pocket-shaped recesses 22. The cutting disks separate the top part of the crop from the stubble remaining in the ground. The stalks of the crop, involving, in particular, corn, are received and held tight in the recesses 22 of the conveying wheels 20.

Between the rear side of the mowing and intake devices 12 and 14, and a rear wall 24 of the machine 10 adapted in shape to the mowing and intake devices 12 and 14, a transverse conveying channel 26 is formed through which the material harvested by the mowing and intake devices 12 and 14 is transported laterally to the center of the machine 10.

The two outer mowing and intake devices 14 are set in rotation such that the harvested material is first conveyed laterally in the direction towards the longitudinal midplane 16 and then backwards against the driving direction V of the machine 10. There, the crop is entrained by the closest inner mowing and intake device 12. This mowing and intake device 12 rotates in the direction opposite the outer mowing and intake device 14, so that it conveys the harvested material first laterally outwards and then backwards. On its side facing the outer mowing and intake device 4, the inner mowing and intake device 12 takes the crop from the outer mowing and intake device 14. A cleaner or stripper 28, which is built from plates engaging in the envelope circle of the outer mowing and intake device 14 and which lifts the crop from the pocket-shaped recesses 22 of the conveying wheel 20 of the outer rowing and intake device 14, causes the transfer of the crop to the mowing and intake device 12, on whose rear side the crop is conveyed in interaction with the rear wall 24 inwards in the direction towards the longitudinal midplane 16. Consequently, the rear sides of the inner mowing and intake devices 12 are used as transverse conveying means 30 for transverse conveyance of the chopped crop and convey it at least approximately transverse to the forward direction V in the direction towards the longitudinal midplane 16 of the machine 10.

In the forward direction V behind the two inner mowing and intake devices 12 there are deflection conveying means 32, configured as inclined conveying drums with rotational axes that are inclined forwards, which convey the crop backwards into an intake channel 34 of a chopping device of a field chopper with intake rollers (not shown) arranged one above the other. The deflection conveying means 32 are built from cylindrical bodies with conveying wheels, which are arranged one above the other and which are provided with tooth-shaped drivers 36 for transporting material.

Figure 3:
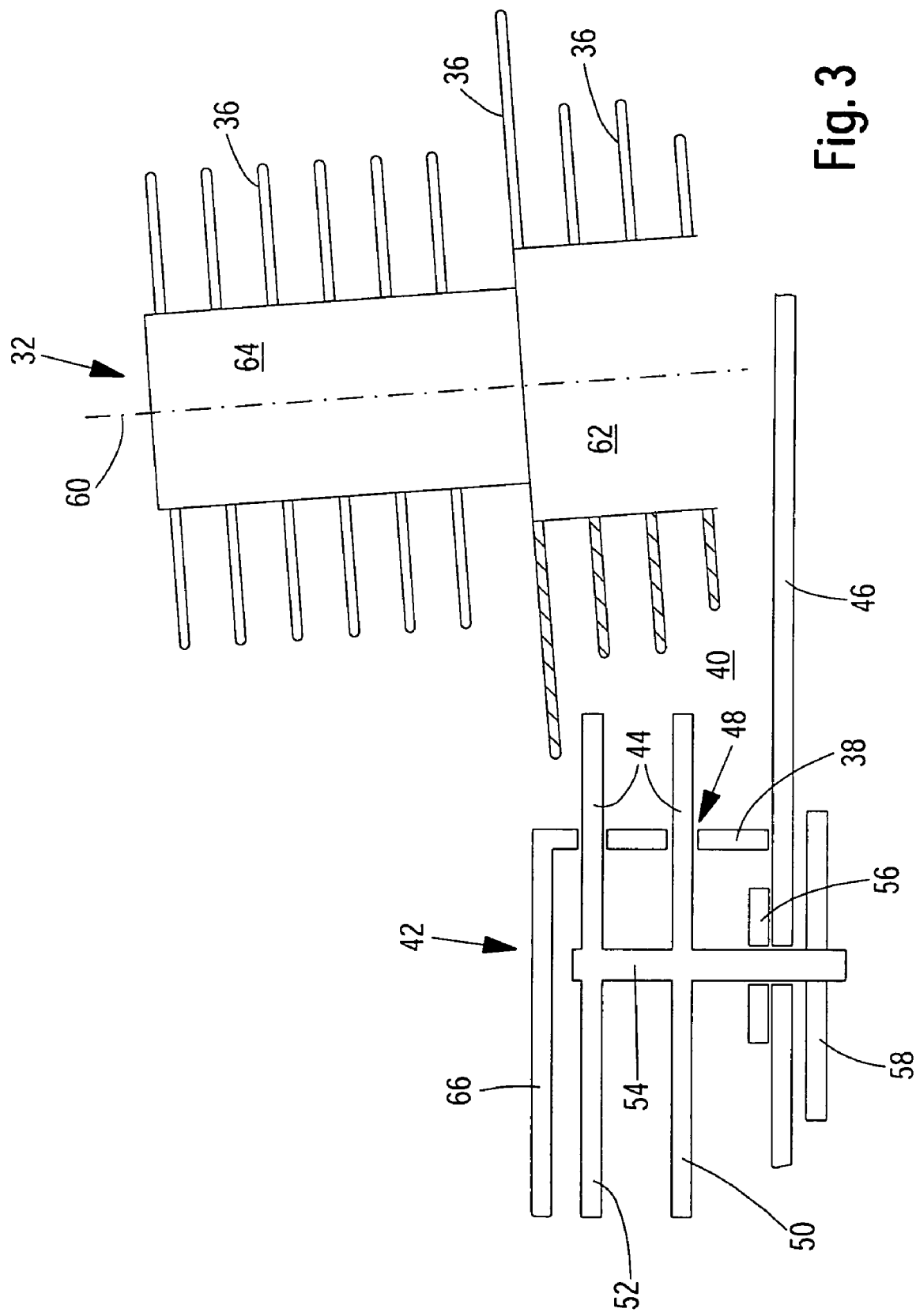
FIG. 3 is a sectional view taken along line 3-3 of FIG. 2.

The deflection of the crop backwards by the deflection conveying means 32 is made easier by curved deflection skids 38, which are arranged on the base of the machine 10 between the deflection conveying means 32, and by a cover 66 arranged on top (see FIG. 3). The front ends of the deflection skids 38 also act as cleaners for the inner mowing and intake devices 12. The deflection skids 38 define the front and inner limit of a curved deflection channel 40 that curves from a lateral direction into a direction pointing backwards, and which connects to the transverse conveying channel 26 and by means of which the crop is led into the intake channel 34.

There are two additional conveying means 42 in the form of conveying wheels with tooth-shaped drivers 44, each of which is assigned to the deflection channel 40 on a different side of the longitudinal midplane 16. The additional conveying means 42 are each rotated about a respective vertical axis in the direction opposite to the deflection conveying means 32. The tooth-shaped drivers project into the deflection channel 40. Each of the additional conveying means 42 is located on the side of the deflection channel 40 that lies opposite a deflection conveying means 32. In this design they are separated from the mowing and intake devices 12 arranged in front. The rotational axes of the deflection conveying means 32 and the correspondingly assigned additional conveying means 42 can be connected by imaginary lines that enclose an angle of approximately 45° with the forward direction V. In the top view shown in FIG. 1, the envelope circles or paths described by the outer ends of the drivers 36, 42 overlap. However, the drivers 44 do not reach into the envelope circle of the conveying wheels 20 of the mowing and intake devices 12 arranged in front.

The mowing and intake devices 12, 14, the additional conveying means 42, and the deflection conveying means 32 are driven by the field chopper via suitable gears. During the harvesting process, the machine 10 moves in the driving direction V over a field. The crop having stalks, possibly deflected laterally by outer dividers (not shown), is cut by the mowing and intake devices 12,14 and conveyed into the transverse conveying channel 26. Due to the conveying effect of the rear sides of the inner mowing and intake devices 12, the crop reaches the deflection skids 38 and the cover 66, by means of which it is deflected backwards into the deflection channel 40. The deflection conveying means 32 and also the additional conveying means 42 feed the crop to the intake channel 34 of the chopping device of the field chopper, where it is chopped and deposited in a wagon. The additional conveying means 42 reduce the friction of the crop against the deflection skids 38 and clean the deflection channel 40 and the deflection conveying means 32 of plant parts, which reduces the risk of clogging.

If the operating width of the machine 10 is to be increased, additional mowing and intake devices can in a known way (see DE 102 49 457 A, whose disclosure is incorporated into the present document by reference) be inserted between the existing mowing and intake devices 12, 14. The crop is then transported to the downstream side of the added mowing and intake device, preferably by means of additional transverse conveying drums that pass through slots in the rear wail 24. Incidentally, it would also be conceivable to change the rotational direction of the inner mowing and intake devices 12, as in the third embodiment of DE 102 49 457 A, so that these devices could discharge the crop into the deflection channel 40 upstream of the additional conveying means 42, while the crop coming in from the other mowing and intake devices 14 is transported by separate conveyors towards the back by the rear sides of the inner mowing and intake devices 12.

Figure 2:
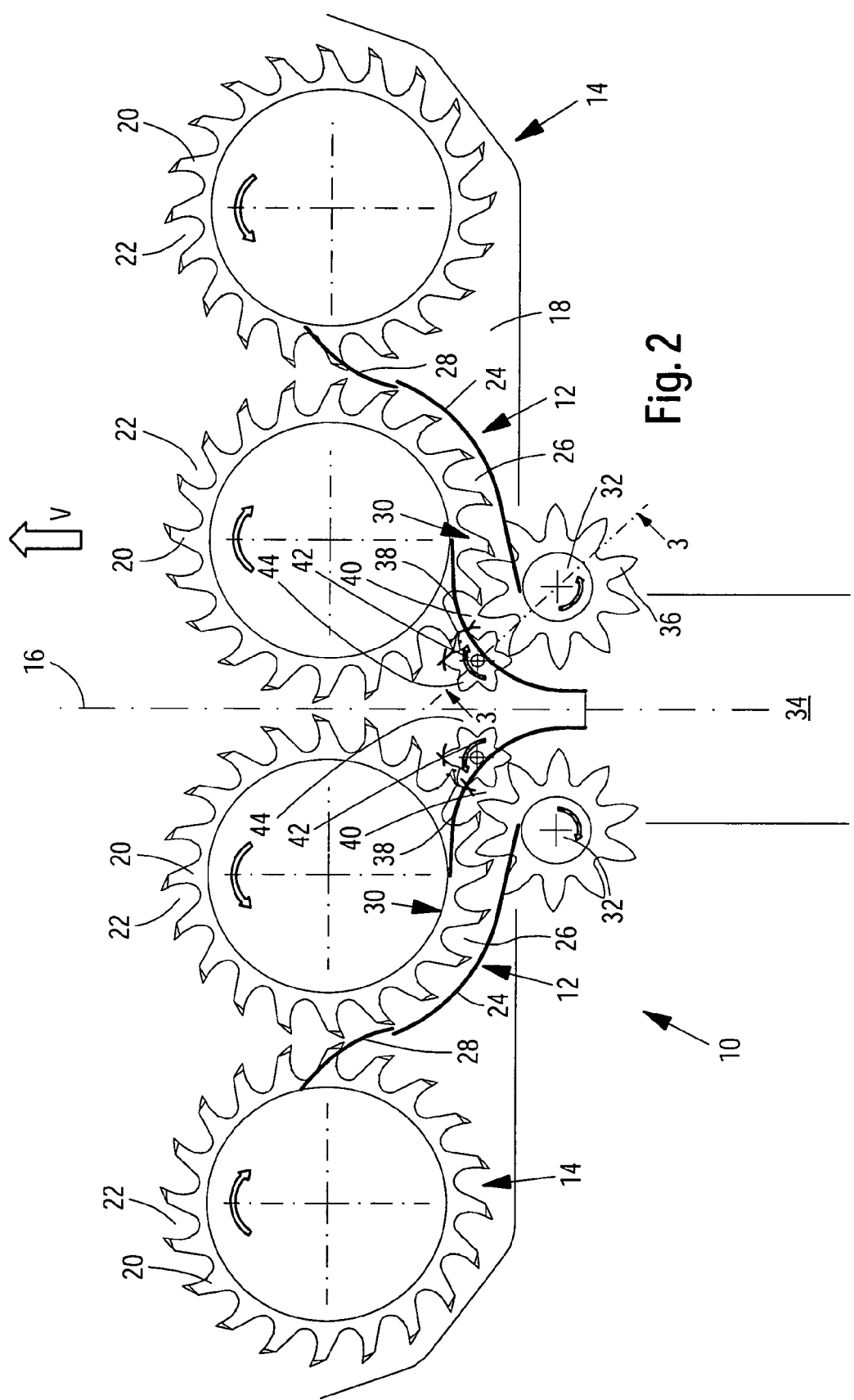
FIG. 2 is a top view of a second embodiment of a machine for mowing crops having stalks.

In the second embodiment shown in FIG. 2, the elements corresponding to the first embodiment are provided with the same reference symbols. The difference from the embodiment of FIG. 1 is that here the envelope circles described by the drivers 44 of the additional conveying means 42 overlap the outer envelope circles of the conveying wheels 20 of the inner mowing and intake devices 12.

FIG. 3 shows a section along the line 3-3 in FIG. 2. This section would look identical in the embodiment from FIG. 1. It can be seen that the deflection skid 38 is attached above a base 46 of the frame 18 of the machine 10 and has a slot 48, through which the drivers 44 of a bottom conveying wheel 50 of the additional conveying means 42 extend. The drivers 44 of a top conveying wheel 52 of the additional conveying means 42 are located above the deflection skid 38. The additional conveying means 42 includes a vertical drive shaft 54, which carries the two conveying wheels 50, 52, that is supported in a bearing 56 on the base 46, and is driven by a gear 58 via a drive train not shown in more detail.

The deflection conveying means 32 also shown in FIG. 3 includes a rotational axis 60 inclined forwards in a known way and is assembled from a bottom drum 62 and a top drum 64 with a smaller diameter relative to the bottom drum 62. The top drivers 36 of the bottom drum 62 of the deflection conveying means 32 overlap the drivers 44 of the additional conveying means 42. With reference to FIG. 3, it can also be seen that the additional conveying means 42 are essentially smaller than the deflection conveying means 32, which has proven to be advantageous for achieving an optimum flow of material.

In a different way from what is shown in FIG. 3, the drivers 36, 44 could, instead of being offset in height, be arranged in a common plane in their overlapping area. Then their rotational speeds would have to be synchronized in order to prevent collisions.

Figure 4:
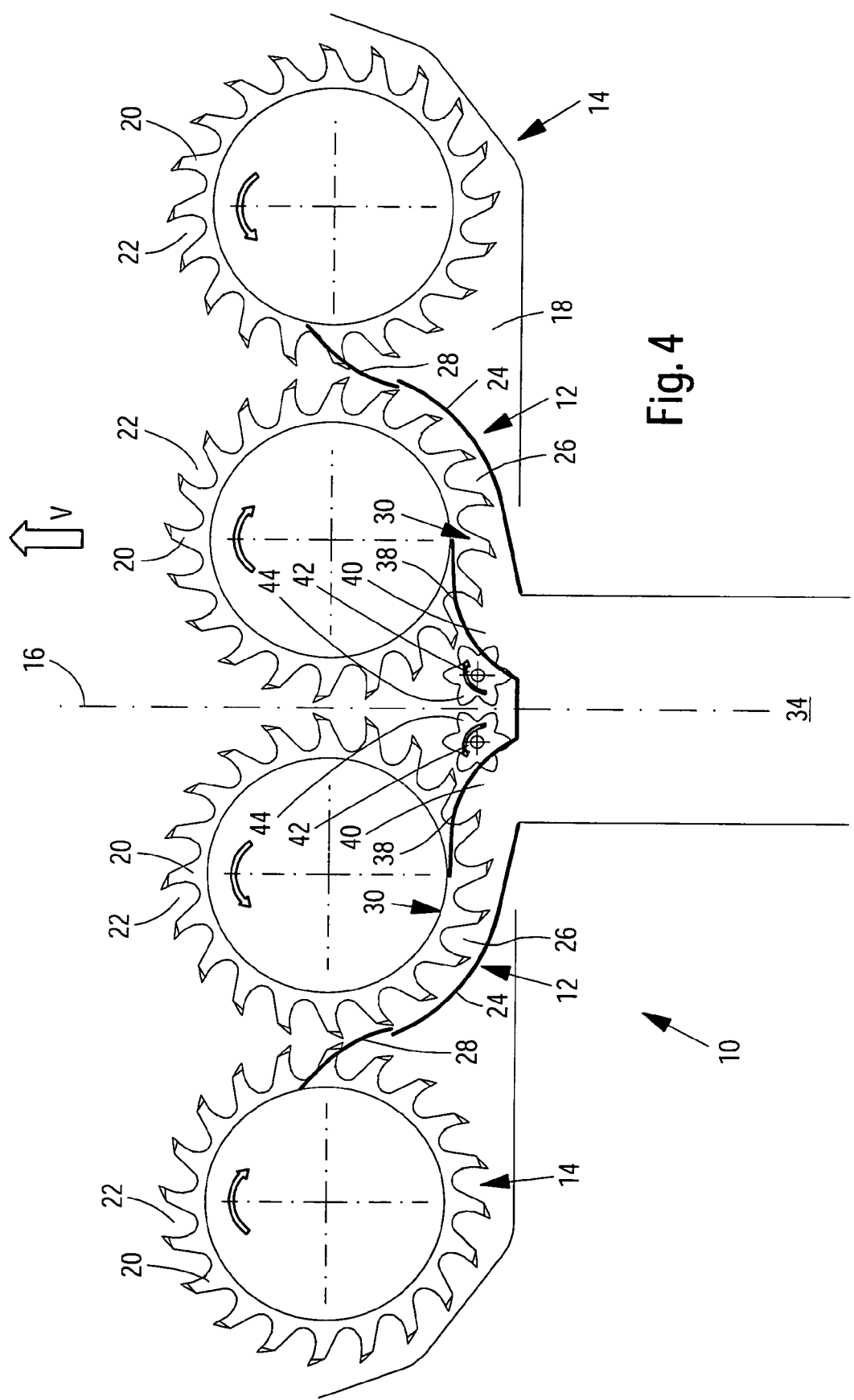
FIG. 4 is a view similar to that of FIGS. 1 and 2, but omitting the deflection conveying means, with the shape of the deflection skids being altered slightly.

Referring now to FIG. 4, there is shown a third embodiment of the invention wherein the deflection conveying means 32 is omitted, as they are not essential to the invention. With the omission of the deflection conveying means 32, the curvature of the deflection skids 38 is altered so as to be less sharp since they no longer have to conform to the path traced by the drivers 36 of the deflection conveying means 32.

Having described the preferred embodiment, it will become apparent that various modifications can be made without departing from the scope of the invention as defined in the accompanying claims.

The invention claimed is:

1. A machine for mowing crops having stalks including a plurality of mowing and intake devices for cutting and conveying the crop, a transverse conveying means for conveying the cut crop transversely, at least approximately perpendicular to a forward direction of travel of said machine and in a direction towards a longitudinal midplane of said machine, and a deflection channel, which curves rearward in an arc from a direction extending perpendicular to said forward direction of travel toward an intake channel centered along said midplane, the improvement comprising: an additional conveying means formed separate from said mowing and intake devices, which is mounted for rotation about an upright axis arranged forward of, and adjacent to, a front side of said deflection channel, said front side of said deflection channel being delimited by a deflection skid, and includes drivers which project within, and move relative to, said deflection channel and deflection conveying means arranged adjacent a rear side of said deflection channel and being equipped with drivers; said deflection conveying means being mounted for rotating about an approximately vertical axis during operation; and said deflection conveying means and said additional conveying means being so located relative to each other that their respective drivers travel in overlapping paths wherein said mowing and intake devices include conveying wheels which move in paths which do not overlap respective paths traveled by drivers of adjacent ones of said additional conveying means.

2. The machine according to claim 1, wherein said additional conveying means is mounted for rotating about an approximately vertical axis during operation.

3. The machine according to claim 1, wherein said deflection skid is provided with slots, and said drivers of said additional conveying means pass through said slots during rotation of said additional conveying means about said axis.

4. The machine according to claim 1, wherein the additional conveying means is smaller in diameter than the deflection conveying means.

5. The machine according to claim 1, wherein said additional conveying means is one of driven or non-driven.

* * * * *